UNITED STATES PATENT OFFICE.

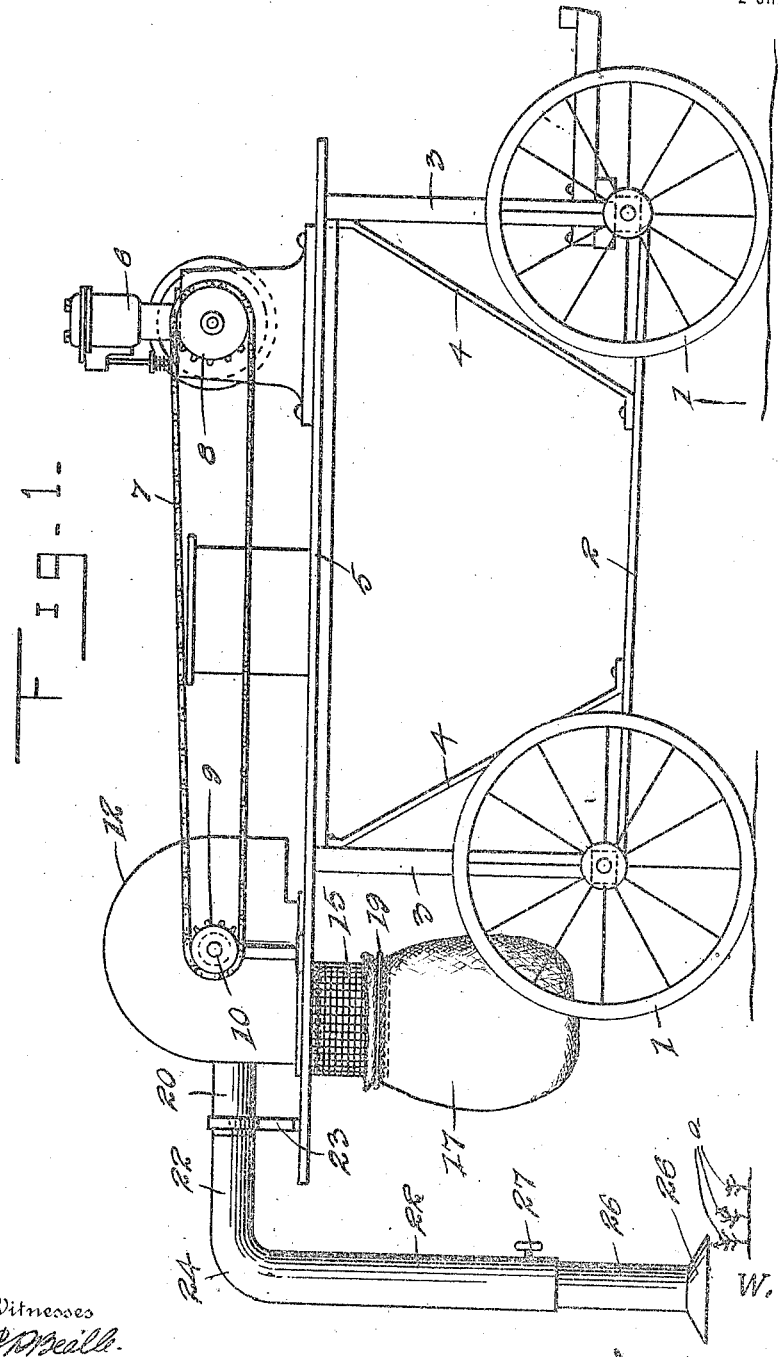

WILLIAM T. COOK, OF RAYVILLE, LOUISIANA.

BOLL-WEEVIL MACHINE.

1,180,977.

Specification of Letters Patent.

Patented Apr. 25, 1916.

Application filed April 3, 1914. Serial No. 829,367.

*To all whom it may concern:*

Be it known that I, WILLIAM T. COOK, a citizen of the United States, residing at Rayville, in the parish of Richland and State of Louisiana, have invented certain new and useful Improvements in Boll-Weevil Machines; and I do hereby declare the following to be a full, clear, and exact description of the invention, such as will enable others skilled in the art to which it appertains to make and use the same.

This invention relates to machines for removing boll weevils from growing cotton plants, and one of the principal objects of the invention is to provide means for creating a suction to withdraw the weevils from the plants and to draw them up through a pipe into a receiver like a bag or other receptacle located immediately under the fan or suction device.

Another object of the invention is to provide a machine for removing boll weevils from growing cotton plants, and to use the same machine for picking cotton at the proper season.

These and other objects may be attained by means of the construction illustrated in the accompanying drawings, in which, Figure 1 is a side elevation of a machine made in accordance with this invention, Fig. 2 is a sectional view taken through the fan casing and adjacent parts, Fig. 3 is a vertical sectional view of the intake end of the telescopic members of the suction pipe, and, Fig. 4 is a sectional view taken on the line 4—4 of Fig. 2 looking in the direction indicated by the arrows.

Referring to the drawings, the numeral 1 designates the traction wheels for supporting a suitable frame comprising a reach 2, uprights 3 and braces 4 and a platform 5. Mounted on the platform 5 is a suitable motor 6, and a belt or chain 7 surrounds the sprocket wheel 8 on the motor shaft and leads to a sprocket wheel 9 on the fan shaft 10. The suction fan 11 is mounted on the fan shaft 10 and inclosed within a casing 12, said casing having an outlet opening 13 supported by a threaded collar 14 extending through the platform 5 of the vehicle. A woven wire tube 15, provided with an inwardly bent upper end 16 is clamped between the outwardly extending flange of the ring 14 and the lower side of the platform 5, as shown more clearly in Fig. 2. A bag 17 is connected to the outwardly flared lower end 18 of the woven wire tube 15 by means of a suitable cord or wire 19.

Extending into the fan casing 12 at one side thereof is an intake pipe 20, the inner end of which is beveled as at 21 to permit the fan blades to pass near the inner edge of said pipe. Connected to the pipe 20 by a slit joint is a pipe 22 and the joint is supported by a bracket 23 supported upon the platform 5. The pipe 22 is curved downwardly as at 24 and inserted in the lower end of the pipe is a telescopic intake nozzle 26 having a tubular extension 25 which telescopes within the lower end of the pipe 22 and is held in adjusted position by means of a thumb screw 27.

The operation of the machine may be briefly described as follows: The machine is drawn over the field and the intake nozzle 26 is disposed immediately above the small growing plant *a* and the suction fan will draw the boll weevils up through the pipe connection and deposit them into the opening 13 through the woven wire tube 15 and into the bag 17. When it is desired to pick the cotton, the telescopic member 25 is moved upward and the intake nozzle 26 is placed over the plant to draw the cotton through into the bag 17.

From the foregoing it will be obvious that a machine made in accordance with this invention is comparatively simple in construction, can be mounted on a vehicle and driven over the field and will operate efficiently for its purpose. Various changes may be made in the details of construction, without departing from the spirit and scope of the invention as defined in the claims.

What is claimed is:—

1. A boll weevil machine comprising a platform mounted on wheels, and provided with an opening, a fan casing having its bottom wall resting upon the upper side of said platform and provided with an outlet opening, a flange formed on said bottom wall about the outlet opening, said flange being located within the opening of the platform and having its outer side screw threaded, a flanged collar having its inner side screw threaded for engagement with the screw threads of said flange, the flange of the collar engaging the underside of the platform to secure the fan casing in position, a fan mounted within the casing, means for operating the fan, a suction pipe leading from the fan casing and provided with an intake nozzle, a tube connected to the collar and a bag removably connected to said tube.

2. A boll weevil machine comprising a platform mounted on wheels and having an opening, a fan casing having a flat bottom wall resting upon the upper side of said platform and provided with an outlet opening, a flange formed on said bottom wall about the outlet opening, said flange being located within the opening in the platform and having its outer side screw threaded, a flanged collar having its inner side screw threaded for engagement with the threaded outer side of said flange, the flange of the collar engaging the underside of the platform to secure the fan casing in position, a woven wire tube having its upper end turned inwardly and disposed between the flange of the collar and the underside of the platform, the lower end of said tube being flared, a bag removably connected to the flaring end of the tube, a fan mounted within the casing, means for operating the fan, and a suction pipe leading from the fan casing and provided with an intake nozzle.

3. A boll weevil machine comprising a platform mounted on wheels and provided with an opening, a fan casing mounted upon the upper side of the platform and provided with a discharge opening registering with the opening in the platform, a woven wire tube, means securing the tube to the underside of the platform about the opening therein, said tube extending downwardly from the underside of the platform and having its lower end flared, a bag removably secured to the flared end of said tube, a fan mounted within the casing, means for operating the fan, and a suction pipe leading from the fan casing and provided with an intake nozzle.

In testimony whereof I affix my signatur in presence of two witnesses.

WILLIAM T. COOK.

Witnesses:
E. B. LIPSCOMB,
M. W. PURVIS.